United States Patent
Nishimura et al.

(12)

(10) Patent No.: US 6,785,207 B2
(45) Date of Patent: Aug. 31, 2004

(54) WOBBLE SIGNAL REPRODUCING CIRCUIT

(75) Inventors: Kouichirou Nishimura, Ebina (JP);
Kouichi Hirose, Yokohama (JP);
Manabu Katsuki, Yokohama (JP);
Toshifumi Takeuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 596 days.

(21) Appl. No.: 09/794,393

(22) Filed: Feb. 28, 2001

(65) Prior Publication Data

US 2001/0026512 A1 Oct. 4, 2001

(30) Foreign Application Priority Data

Mar. 16, 2000 (JP) ........................................ 2000-079288

(51) Int. Cl.[7] ............................................... G11B 5/09
(52) U.S. Cl. ............................... 369/47.27; 369/124.11; 369/47.25; 369/124.1
(58) Field of Search ............................. 369/47.1, 47.25, 369/47.26, 47.27, 47.22, 47.21, 124.1–124.12, 134

(56) References Cited

U.S. PATENT DOCUMENTS 5,202,873 A * 4/1993 Ito et al. ................... 369/47.27
5,606,544 A * 2/1997 Katsuhara ................ 369/47.27
6,160,773 A   12/2000 Maegawa et al.
6,188,654 B1 * 2/2001 Kaku et al. ............... 369/47.27
6,337,838 B1 * 1/2002 Hikima et al. ............ 369/53.31

FOREIGN PATENT DOCUMENTS

| JP | 8-194969 | 7/1996 |
| JP | 11-096570 | 4/1999 |
| JP | 11-203681 | 7/1999 |
| JP | 11-283248 | 10/1999 |

* cited by examiner

Primary Examiner—Doris H. To
Assistant Examiner—Jorge L Ortiz Criado
(74) Attorney, Agent, or Firm—McDermott Will & Emery LLP

(57) ABSTRACT

The present invention has an object to stably reproduce wobble signals of all disks of CD-R/RW, DVD-R/RW and DVD-RAM by one wobble signal reproducing circuit. In the wobble signal reproducing circuit, an AGC (AUTOMATIC GAIN CONTROL) circuit for equating a push-pull circuit output of a wide range and an RF amplitude of an optical detector output of two systems obtained by push-pull, and an AGC circuit for making a wobble amplitude uniform are provided with a function to hold a gain or to change over a response time constant, and an address information recording region (PID region) at the time of reproduction, the AGC (AUTOMATIC GAIN CONTROL) is held or the response time constant is changed over.

6 Claims, 5 Drawing Sheets

PRIOR ART

WOBBLE SIGNAL REPRODUCING CIRCUIT

BACKGROUND OF THE INVENTION

1. Field of the Invention

The present invention relates to a reproducing circuit of a wobble signal recorded on a recordable disk of an optical disk.

2. Description of the Related Art

At present, a write once optical disk such as a CD-R/DVD-R, and a recordable optical disk such as a CD-RW/DVD-RW or DVD-RAM, in addition to a read-only optical disk such as a CD or a DVD-RAM, are put on the market. At the time of recording of these recordable optical disks, clock signal generation from a reproduction signal, which is performed in a conventional read-only disk, can not be performed. Thus, a groove as a portion where information is recorded on a disk is wobbled at a constant period, and a clock signal at the time of recording is generated from a wobble signal obtained by reproducing this wobbling (hereinafter referred to as wobble) by a push-pull system.

FIG. 2 shows a conventional example of a wobble signal reproducing circuit. Reflected light from a laser spot irradiated on a disk forms a far field pattern 2 on an optical detector 1 divided in two. Two outputs of the optical detector are subtracted by a subtracting circuit 17 to take out a push-pull component. From the obtained push-pull signal, a wobble frequency is extracted by a band pass filter (BPF) 18. A wobble signal reproduced from a CD-R/RW is a continuous signal of a frequency of 22.05 KHz±1 KHz. In the CD-R/RW, since address information called ATIP (Absolute Time In Pregroove) is superimposed on the wobble signal by FM modulation, it has a width in frequency band. FIG. 3 is a view showing a disk surface of a DVD-R/RW. Reference numeral 301 in the drawing designates a groove in which data is recorded and which is wobbled similarly to the CD-R/RW. A wobble signal reproduced in the DVD-R/RW is a continuous signal of a single frequency of 140.65 KHz different from the CD-R/RW, and address information is not superimposed. Instead thereof, a pit called a land pre-pit (hereinafter referred to as an LPP) designated by 302 is recorded in a land portion which is between a groove and a groove and in which information is not recorded. The LPP exists in a region from the head of maximum amplitude position of a wobble to the third, and address information is recorded by this three bits.

In order to stably extract the wobble signal from the push-pull signal, it becomes necessary to reduce leakage of an RF signal to the push-pull signal. Thus, as disclosed in Japanese Patent Unexamined Publication No. Hei. 8-194969, it is conceivable that an automatic gain control circuit (AGC circuit) is provided at a front stage of the subtracting circuit of FIG. 2.

Besides, in recent years, as the capacity of a disk is increased, doubling of the speed of disk reproduction becomes active.

In double speed reproduction, it becomes necessary to change over the pass band of the BPF of wobble in connection with the double speed. As a method of causing this connection, although it is conceivable that setting of the pass band of the BPF is changed over by a microcomputer according to the reproducing speed of a disk, since access to the microcomputer becomes necessary each time the speed is changed, the processing becomes troublesome. In the case where CAV reproduction is performed with an increase in speed of disk reproduction, a deviation in band setting of the BPF occurs by the restriction on the number of accesses to the microcomputer, and this becomes a factor of a drop in S/N of the wobble signal and an increase in clock jitter due to that. With respect to this problem, as disclosed in Japanese Patent Unexamined Publication No. Hei. 11-203681, it is conceivable to use pass band automatic tracking by a dummy filter and a phase comparison circuit.

SUMMARY OF THE INVENTION

As set forth above, in the case where double speed reproduction of various disks is realized by one optical disk reproducing device, since the specifications of the respective disks are different, various problems occur. The problems of a wobble signal reproducing circuit are as follows:

1. Leakage of a Land Pre-pit Signal of a DVD-R/RW into a Wobble Signal

Here, in the case where the AGC (AUTOMATIC GAIN CONTROL) circuit is disposed at the front stage of the subtracting circuit of FIG. 2 as disclosed in Japanese Patent Unexamined Publication No. Hei. 8-194969, at the time of reproduction of a DVD-R/RW, an LPP signal leaks into an RF signal, and an AGC (AUTOMATIC GAIN CONTROL) gain is varied in accordance with the amplitude variation. Thus, there is a fear that the RF signal at the time of passing through the LPP leaks into the wobble signal.

2. The Processing for Lack of a Wobble Signal in an Address Information Region of a DVD-RAM FIG. 4 is a view showing a disk surface of a DVD-RAM. Reference numeral 403 in the drawing designates a groove; and 404, a land. In order to raise recording density, the DVD-RAM adopts a land groove recording system in which signals are recorded in both the groove 403 and the land 404. Thus, address information in the DVD-RAM is recorded in a staggering manner with respect to respective tracks of the land and the groove as indicated by 401 and 402 of the drawing. The portion where the address information is recorded is called a PID (Physical Identification Data) region.

Although a wobble signal reproduced in the DVD-RAM has a single frequency of 157 KHz similarly to the DVD-R/RW, since the address information is recorded in the staggering manner in the PID region, when a push-pull component is detected and is subtracted, it lacks a signal at one side before the subtraction. Thus, similarly to the above item 1, in the case of considering provision of the AGC (AUTOMATIC GAIN CONTROL) circuit at the front stage of the subtracting circuit, it is conceivable that the AGC (AUTOMATIC GAIN CONTROL) is saturated in the PID region.

Besides, the wobble signal reproduced in a CD-R/RW has a band width, and the amplitude is varied. In order to reduce an offset due to that at binarization at a later stage, as disclosed in Japanese Patent Unexamined Publication No. Hei 11-161961, it is conceivable that an AGC (AUTOMATIC GAIN CONTROL) circuit is provided at a later stage of the BPF 18. However, in the DVD-RAM, since the groove does not exist in the PID region, it lacks the wobble signal at the time of reproduction of the PID region. Thus, similarly to the above, it is conceivable that this AGC (AUTOMATIC GAIN CONTROL) circuit is saturated in the PID region.

3. BPF Pass Band Setting

In the technique disclosed in Japanese Patent Unexamined Publication No. Hei 11-203681, there are a problem of accuracy of wobble signal band detection in the dummy filter and the phase comparison circuit, and a problem that a circuit scale is increased in order to improve the accuracy of the circuit. In the case where band setting of the BPF is made to follow a clock signal reproduced from a wobble signal, it becomes a problem that a ratio of a wobble signal frequency to a clock frequency is different according to the kind of a disk.

Like this, since the specifications of the wobble signals are different according to the disks, there has been a problem that in the case where the wobble signal reproducing circuits corresponding to the respective disks are provided, a circuit mounting area is increased.

In order to solve the above problems, in a wobble signal reproducing circuit for reproducing a wobble signal recorded by wobbling a groove formed on a disk, the wobble signal reproducing circuit includes an arithmetic circuit for calculating a push-pull signal, a band pass filter for extracting a wobble frequency component from an output of the arithmetic circuit, an AGC (AUTOMATIC GAIN CONTROL) circuit disposed at a front stage or inside of the arithmetic circuit, and land pre-pit detection means for detecting a land pre-pit region where a pit is formed in a land portion which is between the groove and a groove and in which information is not recorded, and a structure is such that a gain of the AGC (AUTOMATIC GAIN CONTROL) circuit is fixed or a response time constant of the AGC (AUTOMATIC GAIN CONTROL) circuit is changed over by a detection signal of the land pre-pit detection means at a time of reproduction of the land pre-pit region.

Besides, there is provided address information recording region detection means for detecting an address information recording region where an address is formed in a portion in which the groove is divided on a track into a land portion, and a structure is such that a gain of the AGC (AUTOMATIC GAIN CONTROL) circuit is fixed or a response time constant of the AGC (AUTOMATIC GAIN CONTROL) circuit is changed over by a detection signal of the address information recording region detection means at a time of reproduction of the address information recording region.

Further, there is provided a second AGC (AUTOMATIC GAIN CONTROL) circuit at an output of the band pass filter for extracting the wobble signal from the push-pull signal, and a structure is such that a gain of the AGC (AUTOMATIC GAIN CONTROL) circuit and a gain of the second AGC (AUTOMATIC GAIN CONTROL) circuit are fixed or a response time constant of the AGC (AUTOMATIC GAIN CONTROL) circuit and a response time constant of the second AGC (AUTOMATIC GAIN CONTROL) circuit are changed over at a time of reproduction of the address information recording region.

Besides, there is provided means for detecting a scratch or a finger print of a disk to be reproduced, and a structure is such that a gain of the AGC (AUTOMATIC GAIN CONTROL) circuit is fixed or a response time constant of the AGC (AUTOMATIC GAIN CONTROL) circuit is changed by an OR operation output of a detection signal of the means and a detection signal of the land pre-pit detection means.

Further, a structure is such that a gain of the AGC (AUTOMATIC GAIN CONTROL) circuit and a gain of the second AGC (AUTOMATIC GAIN CONTROL) circuit are fixed or a response time constant of the AGC (AUTOMATIC GAIN CONTROL) circuit and a response time constant of the second AGC (AUTOMATIC GAIN CONTROL) circuit are changed by an OR operation output of a detection signal of means for detecting a scratch or a finger print of a disk to be reproduced and a detection signal of the address information recording region detection means.

Besides, the land pre-pit detection means detects a land pre-pit recording region by a detection signal corresponding to a land pre-pit region position or the signal generated from the detection signal of the means and a clock obtained in synchronization with a rotation speed of the disk.

Further, the address information recording region detection means detects an address information recording region by a detection signal corresponding to an address information recording region position, the signal generated from the detection signal and a wobble signal, or the signal generated from the detection signal of the means and a clock obtained in synchronization with a rotation speed of the disk.

Besides, a pass frequency band of the band pass filter is substantially in proportion to a frequency of a clock obtained in synchronization with a rotation speed of the disk, and a proportionality coefficient between the pass frequency band and the frequency of the clock can be changed. Further, there are provided a scratch detection circuit for detecting a scratch or a finger print of the disk, and a function for fixing the pass frequency band of the band pass filter at a time of detection of the scratch.

Besides, there is provided a function in which a frequency of a clock obtained in synchronization with a rotation speed of the disk is measured and a pass frequency band of the band pass filter is fixed when the frequency is largely varied at a time of normal reproduction.

Besides, an arithmetic circuit for calculating a push-pull signal has a band for permitting a land pre-pit signal of a land pre-pit region to pass, and there is provided land pre-pit detection means for making the output of the arithmetic circuit the land pre-pit signal.

Further, a wobble signal reproducing circuit includes an arithmetic circuit for calculating a push-pull signal, a band pass filter for extracting a wobble signal frequency component from an output of the arithmetic circuit, and a subtracting circuit for subtracting an output of the band pass filter from the output of the arithmetic circuit, and a structure is such that the arithmetic circuit and the subtracting circuit have bands for permitting a land pre-pit signal of a land pre-pit region to pass, and there is provided land pre-pit detection means for making the output of the subtracting circuit the land pre-pit signal.

DETAILED DESCRIPTION OF THE PREFERRED EMBODIMENTS

Figure 1:
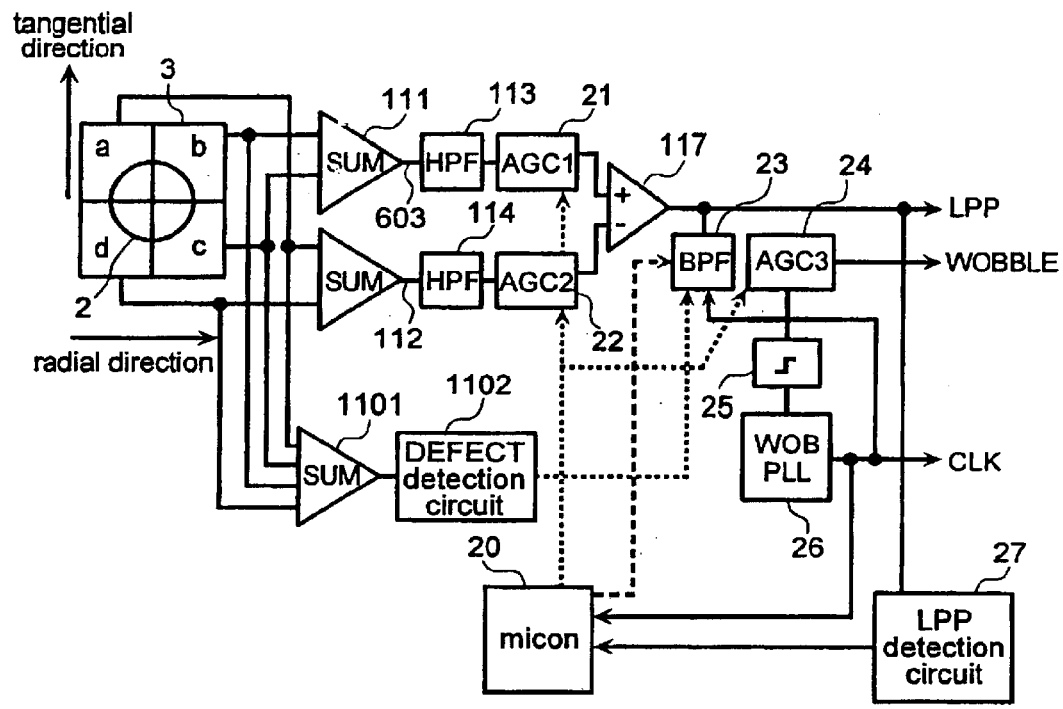
FIG. 1 is a circuit block diagram of a wobble signal reproducing circuit of a first embodiment of the present invention.

Prior to explanation of the drawings, reference numerals used in the drawings will be explained.

1, 3 . . . optical detector, 2 . . . far field pattern, 111, 112, 1101 . . . adding circuit, 113, 114 . . . high band pass filter, 21 to 23 . . . AGC (AUTOMATIC GAIN CONTROL) circuit, 28, 117 . . . subtracting circuit, 20 . . . microcomputer, 23 . . . band pass filter, 25 . . . binarization circuit, 26 . . . phase lock loop (PLL) circuit, 27 . . . land pre-pit detection circuit, 301, 403, 701 . . . wobble track, 302 . . . land pre-pit, 401, 402 . . . PID portion, 502 . . . amplitude detection circuit, 504 . . . charge pump circuit, 601 to 603 . . . operational amplifier, 901, 902 . . . gm variable amplifier, 905 . . . variable current source, 908 . . . fixed current source, 1102 . . . scratch detection circuit, 1104 . . . OR circuit.

Figure 2:
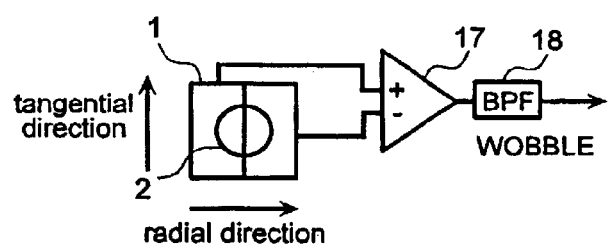
FIG. 2 is a circuit block diagram of a conventional wobble signal reproducing circuit.
Figure 3:
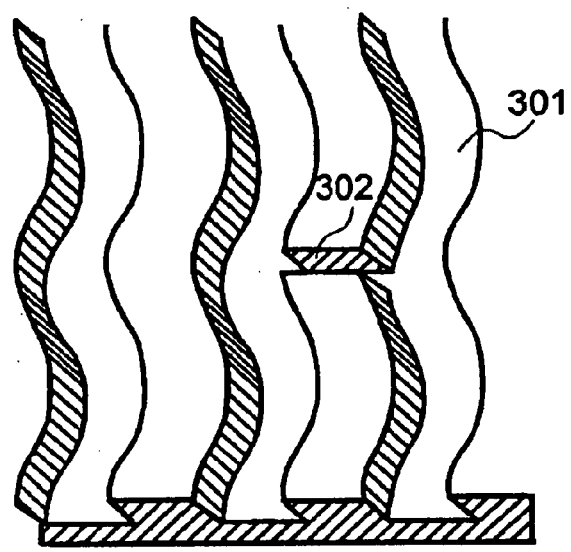
FIG. 3 is a view schematically showing a land pre-pit of a DVD-R/RW.

FIG. 1 is a circuit block diagram of a first embodiment of the present invention. In the drawing, a block having the same function as a block in FIG. 2 is designated by the same character as FIG. 2 and its explanation is omitted. Reference numerals 111 and 112 designate wide band adding circuits; 113 and 114, wide band HPFs; and 117, a wide band subtracting circuit. Reference numerals 21, 22 and 24 designate AGC (AUTOMATIC GAIN CONTROL) circuits provided with a gain hold function, and a gain is fixed by a control signal from a microcomputer 20. Among them, the AGC (AUTOMATIC GAIN CONTROL) circuits 21 and 22 disposed at the front stage of a push-pull arithmetic circuit constituted by the subtracting circuit 117 are made wide band AGC (AUTOMATIC GAIN CONTROL) circuits. However, in the case where the HPFs 113 and 114 and the subtracting circuit 117 are defined as the push-pull arithmetic circuit, although the circuits become AGC (AUTOMATIC GAIN CONTROL) circuits disposed in the inside of the push-pull arithmetic circuit, the push-pull arithmetic circuit of this embodiment indicates a subtracting portion, and hereinafter, the arrangement of the AGC (AUTOMATIC GAIN CONTROL) circuits 21 and 22 is made the front stage of the push-pull arithmetic circuit. Reference numeral 27 designates a circuit for detecting an LPP signal recorded in a DVD-R/RW, and LPP detection by the circuit structure is made possible by making the circuits from the adding circuit to the subtracting circuit have a wide band. Reference numeral 23 designates a BPF in which the pass band is changed substantially in proportion to a clock frequency, and a proportionality coefficient between the clock frequency and the pass band can be changed by the microcomputer 20. Reference numeral 25 designates a slice circuit which binarizes a wobble signal. Reference numeral 26 designates a PLL circuit for generating a clock signal from the binarized wobble signal. Reference numerals 1101 and 1102 designate defect detection circuits for detecting a scratch, a finger print and the like of a disk from an RF signal. Reference numeral 101 designates a control signal to the AGC (AUTOMATIC GAIN CONTROL) circuits; and 102, a control signal to the BPF 23.

Figure 5:
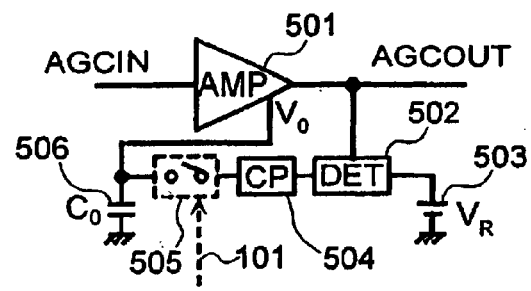
FIG. 5 is a circuit block diagram showing an example of an AGC (AUTOMATIC GAIN CONTROL) circuit of the first embodiment of the present invention.

FIG. 5 shows an example of a circuit structure of the AGC (AUTOMATIC GAIN CONTROL) circuit 21, 22 or 23. Reference numeral 501 in the drawing designates a gain variable amplifier for performing gain control by a voltage V0; and 502, a detection circuit which detects an amplitude and outputs a difference from a reference voltage VR as a control voltage. Reference numeral 504 uses the control voltage output from the wave detection circuit 502 to perform charge and discharge of a capacitor 506. Reference numeral 505 designates an AGC (AUTOMATIC GAIN CONTROL) hold switch, and when the switch is turned off, the control voltage V0 of the gain variable amplifier 501 is held by the capacitor 506 and the gain of the amplifier 501 is fixed.

Hereinafter, an AGC (AUTOMATIC GAIN CONTROL) operation of this embodiment will be described.

At the time of reproduction of a CD-R/RW, wobble is a continuous signal, and a pit does not exist in a land portion, so that leakage does not occur. Thus, the switch 505 of FIG. 5 is always used in an on state, and the AGC (AUTOMATIC GAIN CONTROL) operation is not held.

Figure 6:
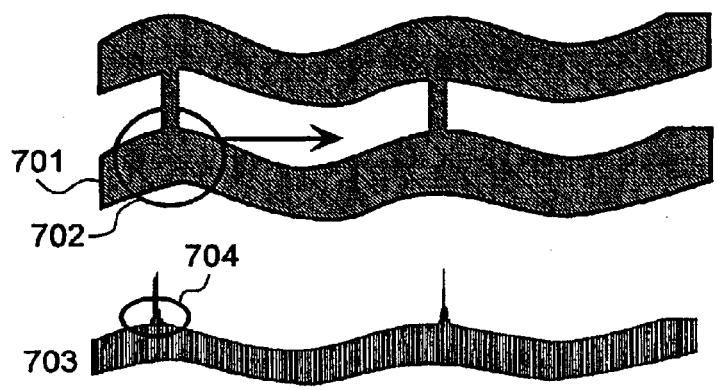
FIG. 6 is a schematic view showing that a land pre-pit signal leaks into an RF signal at the time of reproduction of a DVD-R/RW.

FIG. 6 is a schematic view showing an output waveform of an optical detector at the time of reproduction of a DVD-R/RW. When a signal recorded in a wobble 701 on the disk is reproduced by a light spot 702, the amplitude of an output 703 of the optical detector of FIG. 1 is varied as indicated by 704 by leakage of the signal by the LPP. Thus, at the time of reproduction of the LPP, the switch 505 of FIG. 5 is turned off, so that the AGC (AUTOMATIC GAIN CONTROL) operation of the AGC (AUTOMATIC GAIN CONTROL) 1 and 2 at the front stage of the push-pull arithmetic circuit of FIG. 1 is held, and the gain of the AGC (AUTOMATIC GAIN CONTROL) 1 and 2 does not follow the amplitude variation. Since the LPP exists in synchronization with wobbling of the groove of the disk, after the LPP detection circuit 27 of the drawing detects the first LPP, a clock signal reproduced from a wobble signal is counted by the microcomputer to detect the LPP position, and the AGC (AUTOMATIC GAIN CONTROL) operation is held. By this, AGC (AUTOMATIC GAIN CONTROL) gain variation by the RF amplitude change at the time of reproduction of the LPP is prevented and leakage of the RF signal into the wobble signal can be reduced. Further, in addition to the above, also with respect to the operation of the AGC (AUTOMATIC GAIN CONTROL) 3 at the back stage of the BPF of FIG. 1, by performing the same control as the AGC (AUTOMATIC GAIN CONTROL) 1 and 2, it is possible to prevent gain variation of the AGC (AUTOMATIC GAIN CONTROL) 3 by the wobble signal amplitude change at the time of reproduction of the LPP and to stabilize the reproduction of the wobble signal.

Figure 4:
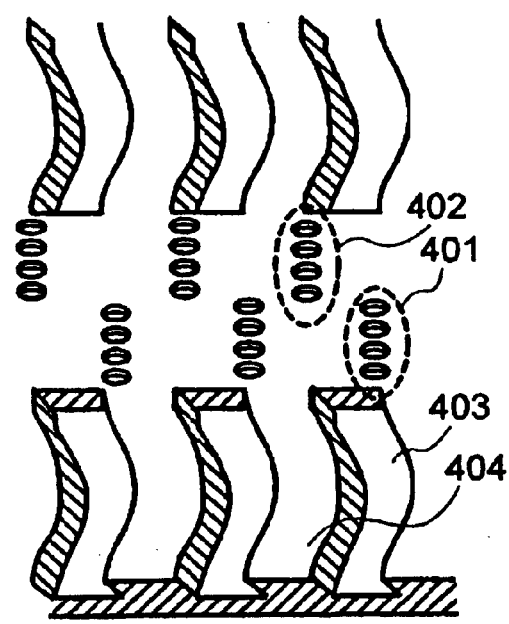
FIG. 4 is a view schematically showing a PID region of a DVD-RAM.

In a DVD-RAM, as shown in FIG. 4, since data is recorded in the staggering manner in the PID regions 401 and 402, in the case where the wobble signal is reproduced in the regions by the circuit of FIG. 1, there is a possibility that input of the AGC (AUTOMATIC GAIN CONTROL) 1 and 2 becomes signalless and the operation is saturated. Besides, since a groove does not exist in the PID region, there is a possibility that it lacks the wobble signal at the time of reproduction in the region and the operation of the AGC (AUTOMATIC GAIN CONTROL) 3 is saturated. Thus, at the time of reproduction in the PID region, in the AGC (AUTOMATIC GAIN CONTROL) 1 to 3, the switch 505 of FIG. 5 is turned off, and the AGC (AUTOMATIC GAIN CONTROL) operation is held, so that saturation is prevented. Incidentally, since the PID region exists in synchronization with the wobbling of the land and the groove of the disk, after the first PID region is detected, a wobble signal or a clock signal reproduced from the wobble signal is counted by the microcomputer to detect the PID region, and the AGC (AUTOMATIC GAIN CONTROL) operation is held. By this, it is possible to prevent saturation of AGC (AUTOMATIC GAIN CONTROL) by lack of the wobble signal in the PID region.

By the above operation, in the circuit of FIG. 1 and FIG. 5, it is possible to stably operate the AGC (AUTOMATIC GAIN CONTROL) circuits at the time of recording and reproduction of the CD-R/RW, DVD-R/RW and DVD-RAM.

Figure 7:
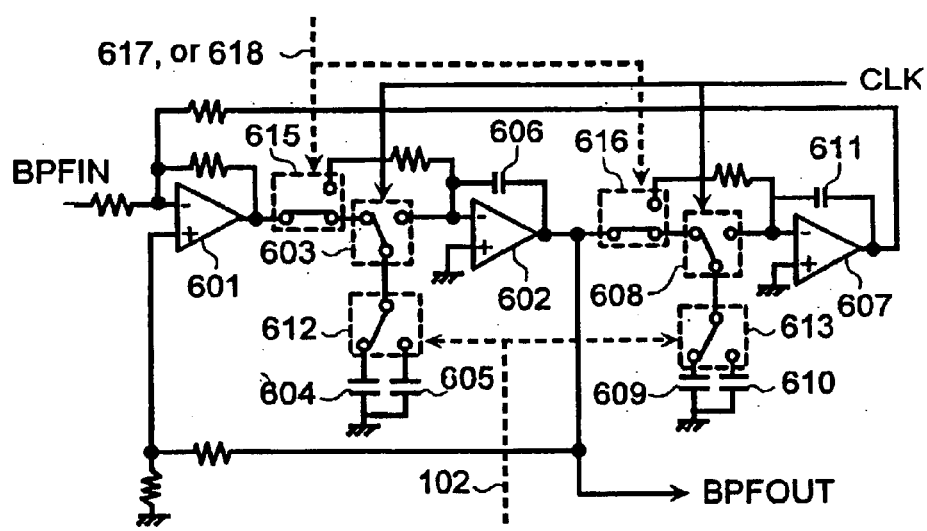
FIG. 7 is a circuit block diagram showing an example of a band pass filter circuit of the first embodiment of the present invention.

FIG. 7 shows an example of a circuit structure of the BPF circuit 23. Reference numerals 601, 602 and 607 designate operational amplifiers, and the operational amplifier 602, together with a switch 603 controlled by a clock signal and capacitors 604 to 606, constitutes a switched capacitor filter. Similarly, the operational amplifier 607, a switch 608 and capacitors 609 to 611 constitute a switched capacitor filter, and the operational amplifier 601 and the two-stage switched capacitor filters constitute a state variable type filter. A pass band of the filter is determined by a cut off frequency fc of the switched capacitor filter. When a capacitance value of the capacitor 604 is C1, a capacitance value of the capacitor 606 is C2, and a switching frequency is fsw, fc of the switched capacitor filter constituted by the operational amplifier 602 is expressed by the following expression.

$$fc=(1/2\pi)\times(C1/C2)\times fsw$$

Since fc of the filter is in proportion to the switching frequency, when the wobble frequency is changed by the change of reproduction speed and the clock frequency reproduced from the wobble is changed, fc of the switched capacitor filter is changed in proportion to that. By this, the pass band of the BPF can be made substantially proportional to the wobble frequency, and band setting of the BPF by means such as register setting of the microcomputer from the outside becomes unnecessary, so that troublesome processing can be reduced. Further, it is possible to reduce a drop in S/N of the wobble signal by a deviation between band setting of the BPF and the wobble signal frequency, and to reduce an increase in jitter of clock generated from the wobble signal.

The ratio of the wobble frequency to the clock frequency in the DVD-R/RW and DVD-RAM is 1:186, which is different from the ratio 1:196 of the wobble frequency to the clock frequency in the CD-R/RW. This difference is treated in such a manner that switches 612 and 613 are changed over by a control signal 102 of FIG. 7 to change the capacitance value C1, so that a proportionality coefficient between fc and fsx is changed. According to this structure, by the BPF of FIG. 1 and FIG. 7, it is possible to deal with high speed recording, high speed reproduction, variable recording such as CAV, and variable reproduction of CD-R/RW, DVD-R/RW, and DVD-RAM.

Incidentally, in the case where the wobble signal is not reproduced by a scratch, a finger print and the like of a disk, since the clock comes not to be reproduced, the pass band of the filter becomes unstable. Thus, a defect signal obtained by the defect detection circuit is made a BPF hold signal 617 to control switches 615 and 616, and the switches are connected to the resister side at the time of detection of the defect, so that the band of the filter is fixed.

Like this, according to the circuit structure of the first embodiment, one wobble signal reproducing circuit can deal with high speed recording, high speed reproduction, variable recording such as CAV, and variable reproduction of CD-R/RW, DVD-R/RW, and DVD-RAM to reproduce the stable wobble signal, and the circuit mounting area in the optical disk reproducing device can be greatly reduced.

Figure 8:
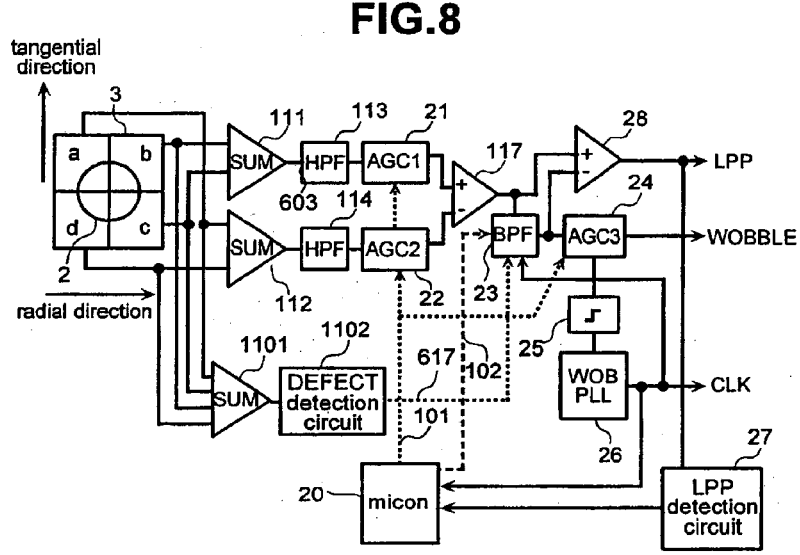
FIG. 8 is a circuit block diagram showing an example of a band pass filter circuit of a second embodiment of the present invention.

Next, a second embodiment of the present invention will be described. FIG. 8 is a block diagram of this embodiment. In the drawing, a block having the same function as a block of FIG. 1 is designated by the same character as FIG. 1 and the explanation is omitted. Reference numeral 28 designates a wide band subtracting circuit, which subtracts an output of a BPF 23 from a wide band push-pull output obtained by a subtracting circuit 117. By this, a wobble frequency component can be removed from the LPP output of FIG. 1, and more stable LPP detection becomes possible.

Figure 9:
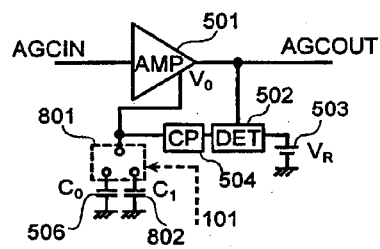
FIG. 9 is a circuit block diagram showing an example of an AGC (AUTOMATIC GAIN CONTROL) circuit of the second embodiment of the present invention.

FIG. 9 shows an example of a structure of an AGC (AUTOMATIC GAIN CONTROL) circuit in this embodiment. In the drawing, a block having the same function as the AGC (AUTOMATIC GAIN CONTROL) circuit of FIG. 5 is designated by the same character, and the explanation is omitted. Reference numeral 801 designates a capacitor change-over switch, which changes over capacitors 506 and 802 by a control signal 101. Capacitance values C0 and C1 in the drawing are made to have the following relation.

$$C1 \gg C0$$

An AGC (AUTOMATIC GAIN CONTROL) operation of this embodiment will be hereinafter described.

At the time of reproduction of a CD-R/RW, since an RF signal and a wobble signal are stably reproduced without leakage, intermittence, or the like, the switch 801 selects the capacitor 506 having the small capacitance value and does not perform change-over.

At the time of reproduction of a DVD-R/RW, as shown in FIG. 6, since there is an amplitude variation due to leakage of an LPP into an RF signal, the switch 801 is changed over to select the capacitor 802 having the large capacitance value at the time of reproduction of the LPP. By this, the response time constant of the AGC (AUTOMATIC GAIN CONTROL) becomes large, and response becomes slow. Thus, the AGC (AUTOMATIC GAIN CONTROL) comes not to follow the RF amplitude variation and the wobble amplitude variation due to the leakage of the LPP, and similarly to the embodiment 1, the effect of stabilizing the wobble amplitude can be obtained. The detection of the LPP is performed, similarly to the embodiment 1, by counting the clock signal reproduced from the wobble signal by the microcomputer.

At the time of reproduction of a DVD-RAM, since AGC (AUTOMATIC GAIN CONTROL) input becomes signalless in the PID region, the switch 801 is changed over at the time of reproduction of the PID region, and the response time constant of the AGC (AUTOMATIC GAIN CONTROL) circuit is made large. Similarly to the embodiment 1, the detection of the PID region is performed by counting the clock signal reproduced from the wobble signal by the microcomputer. By this, an erroneous operation of the AGC (AUTOMATIC GAIN CONTROL) by input without signal is prevented, and it is possible to stably operate the AGC (AUTOMATIC GAIN CONTROL) even at the time of passing through the PID region.

From the above, also in this embodiment, similarly to the embodiment 1, the AGC (AUTOMATIC GAIN CONTROL) can be stably operated at the time of recording and reproduction of the CD-R/RW, DVD-R/RW and DVD-RAM, and the same effect as the embodiment 1 can be obtained.

Figure 10:
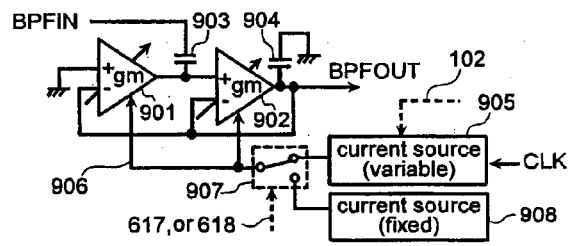
FIG. 10 is a circuit block diagram showing an example of a band pass filter circuit of the second embodiment of the present invention.

FIG. 10 shows an example of a structure of the BPF circuit in this embodiment. Reference numerals 901 and 902 designate gm variable amplifiers, and gm (mutual conductance of output current to input voltage) is changed substantially in proportion to the value of current from a current source 905. This circuit constitutes a biquartic filter by the amplifiers 901 and 902 and capacitors 903 and 904. By making a current source 905 for controlling gm have such a structure that an output current value is substantially in proportion to an input clock frequency, similarly to the BPF circuit of the embodiment 1, the pass band of the BPF can be changed substantially in proportion to the change of the reproduction speed.

Figure 11:
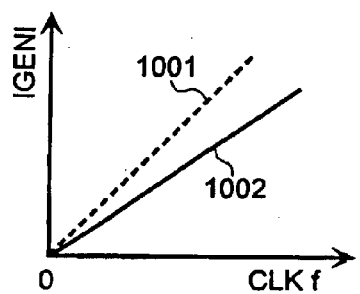
FIG. 11 is a view showing the relation between an input clock frequency of a current source 905 of a filter of FIG. 10 and an output current.

Further, by a control signal 102, as shown in FIG. 11, by changing the proportionality coefficient between a clock frequency and an output current in the current source 905, it is possible to deal with disks having different ratios of the wobble frequency to the clock frequency, such as CD-R/RW, DVD-R/RW, and DVD-RAM, and the same effect as the BPF circuit of the embodiment 1 can be obtained. Incidentally, a defect signal obtained by a defect detection circuit is made a hold signal 617 to control a switch 907, and the switch 907 is connected to a fixed current source at the time of detection of a defect. By this, in the case where it lacks the wobble signal by a scratch, a finger print or the like of the disk and the clock is not reproduced, the pass band of the BPF can be fixed, and the filter can be stably operated.

By the structure of the AGC (AUTOMATIC GAIN CONTROL) circuit and the BPF circuit, even in the embodiment 2, the same effect as the embodiment 1 can be obtained.

Figure 12:
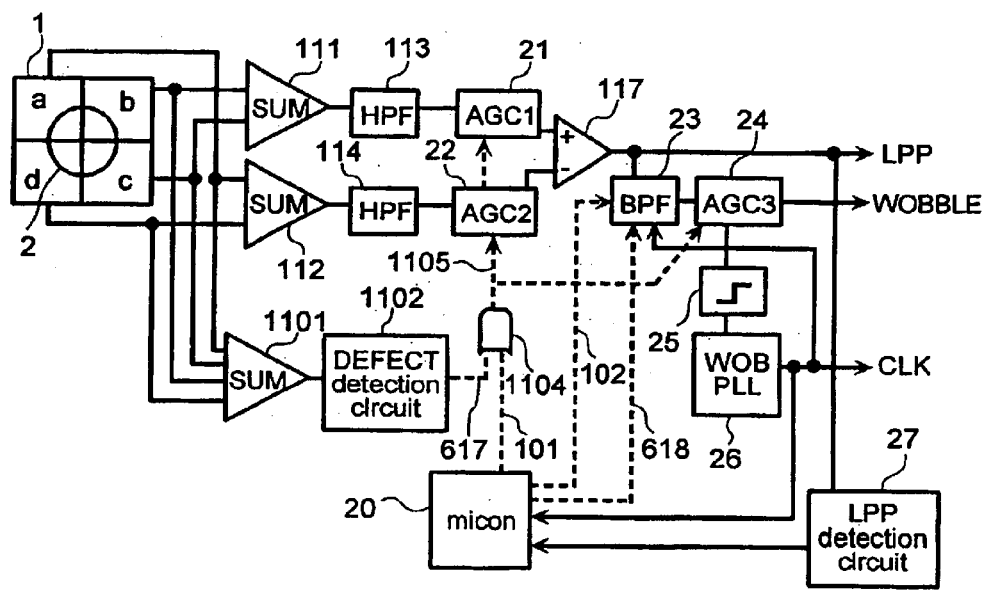
FIG. 12 is a circuit block diagram of a wobble signal reproducing circuit of a third embodiment of the present invention.

FIG. 12 is a circuit block diagram of a third embodiment of the present invention. In the drawing, a block having the same function as a block of FIG. 1 is designated by the same character as FIG. 1, and the explanation is omitted. Reference numeral 101 in the drawing designates a control signal for holding the operation of the AGC (AUTOMATIC GAIN CONTROL) circuit or for changing the response time constant in the embodiments 1 and 2, and the control signal and a defect detection signal 618 of a scratch, a finger print or the like outputted from a defect detection circuit 1102 are inputted to an OR circuit 1104 to generate an AGC (AUTOMATIC GAIN CONTROL) control signal 1105. By this, with respect to not only the LPP region of the DVD-R/RW and the PID region of the DVD-RAM but also the defect such as a scratch of the disk, the AGC (AUTOMATIC GAIN CONTROL) operation can be made stable, and the reliability of the wobble signal can be improved.

Besides, the frequency of the clock signal reproduced from the wobble signal is monitored by a microcomputer, and in the case where a large variation occurs in the frequency at the time of normal reproduction, the BPF hold signal 617 is outputted. By this, in the case where the wobble signal is not reproduced by a scratch, a finger print or the like, and the clock signal is not reproduced, the pass band of the BPF can be fixed, and the filter can be stably operated.

As described above, in this embodiment, the push-pull signal detection circuit is made to have a wide band, and the push-pull signal output is inputted to the LPP detection circuit at the time of reproduction of the DVD-R/RW to detect the LPP. By this, the LPP signal can be detected by the wobble signal reproducing circuit and the circuit scale can be reduced.

Besides, there is provided a function in which the operation of the AGC (AUTOMATIC GAIN CONTROL) circuit for removing the RF signal with precision and the AGC (AUTOMATIC GAIN CONTROL) circuit at the back stage of the BPF circuit can be held by the control signal from the microcomputer, or the time constant can be changed over.

By this, it is possible to suppress variation of the AGC (AUTOMATIC GAIN CONTROL) by leakage of the LPP signal into the RF signal in the LPP region at the time of reproduction of the DVD-R/RW. Besides, it is possible to prevent an erroneous operation such as saturation of the AGC (AUTOMATIC GAIN CONTROL) output by disappearance of the wobble signal in the ID region at the time of reproduction of the DVD-RAM.

Further, such structure is adopted that the pass band of the BPF for extracting the wobble frequency is substantially in proportion to the clock frequency reproduced from the wobble, and the proportionality coefficient between the clock frequency and the pass band of the BPF can be changed over. By this, with respect to the disks having different ratios of the wobble frequency to the clock frequency, such as the CD-R/RW, DVD-R/RW and DVD-RAM, the wobble frequency can be extracted using the same BPF.

Incidentally, the circuit structures illustrated in the embodiment 1 to the embodiment 3 of the present invention are merely examples, and the AGC (AUTOMATIC GAIN CONTROL) circuit and the BPF circuit are not limited to the embodiments of the present invention. Besides, the combination of the structure of the LPP detection circuit, the method of holding the AGC (AUTOMATIC GAIN CONTROL) circuit and changing over the time constant, and the method of fixing the pass band of the BPF is not also limited to the embodiments of the present invention.

As described above, with respect to the recordable and reproducible optical disk such as the CD-R/RW, DVD-R/RW and DVD-RAM, one wobble signal reproducing circuit can stably reproduce the wobble signal, and further, by this circuit, LPP detection in the DVD-R/RW can also be performed. By this, a circuit mounting area in the optical disk reproducing device can be greatly reduced.

What is claimed is:

1. A wobble signal reproducing circuit for reproducing a wobble signal recorded by wobbling a groove formed on a disk, comprising:

an arithmetic circuit for calculating a push-pull signal;

a band pass filter for extracting a wobble frequency component from an output of the arithmetic circuit;

an AGC (AUTOMATIC GAIN CONTROL) circuit disposed at a front stage or inside of the arithmetic circuit; and an address information recording region detection means for detecting an address information recording region where an address is formed in a portion in which the groove is divided on a track into a land portion, wherein:

a gain of the AGC circuit is fixed or a response time constant of the AGC circuit is changed over by a detection signal of the address information recording region detection means at a time of reproduction of the address information recording region, and the AGC circuit holds the gain just before the address information recording region during reproducing the address information recording region.

2. A wobble signal reproducing circuit according to claim 1, further comprising a second AGC (AUTOMATIC GAIN CONTROL) circuit at an output of the band pass filter for extracting the wobble signal from the push-pull signal, wherein a gain of the AGC circuit and a gain of the second AGC circuit are fixed or a response time constant of the AGC circuit and a response time constant of the second AGC circuit are changed over at the time of reproduction of the address information recording region.

3. A wobble signal reproducing circuit according to claim 2, further comprising means for detecting a scratch or a finger print of the disk to be reproduced, wherein a gain of the AGC circuit and a gain of the second AGC circuit are fixed or a response time constant of the AGC circuit and a response time constant of the second AGC circuit are changed by an OR operation output of a detection signal of the means and a detection signal of the address information recording region detection means.

4. A wobble signal reproducing circuit according to claims 1, wherein the address information recording region detection means detects an address information recording region by a detection signal corresponding to an address information recording region position, the signal generated from the detection signal and a wobble signal, or the signal generated from the detection signal of the means and a clock obtained in synchronization with a rotation speed of the disk.

5. A wobble signal reproducing circuit according to claim 1, wherein:

the arithmetic circuit has a band for permitting passage of a land pre-pit signal of a land pre-pit region where a pit is formed in a land portion which is between the groove and a groove and in which information is not recorded, and the address information recording region detection means make the output of the arithmetic circuit the address information signal.

6. A wobble signal reproducing circuit according to claim 1, wherein:

the wobble signal reproducing circuit further comprises a subtracting circuit for subtracting an output of the band pass filter from the output of the arithmetic circuit, the arithmetic circuit and the subtracting circuit have bands for permitting passage of a land pre-pit signal of a land pre-pit region where a pit is formed in a land portion which is between the groove and a groove and in which information is not recoded, and the address information recording region detection means make the output of the subtracting circuit the address information signal.

* * * * *